Chesney & Brown.
Hoop Skirt Machine.

No. 2025 Reissued Jul. 4, 1865.

Witnesses

C. A. Crosby
S. C. Johnson.

Inventors.

Samuel M. Chesney
Jonathan C. Brown.
By their Atty.
John E. Earle

UNITED STATES PATENT OFFICE.

ICHABOD WASHBURN AND P. L. MOEN, OF WORCESTER, MASS., ASSIGNEES, BY MESNE ASSIGNMENTS, OF S. M. CHESNEY AND J. C. BROWN.

IMPROVEMENT IN APPARATUS FOR SIZING AND FINISHING SKIRT-WIRE.

Specification forming part of Letters Patent No. 40,244, dated October 13, 1863; Reissue No. 2,025, dated July 4, 1865.

*To all whom it may concern:*

Be it known that SAML. M. CHESNEY and JONATHAN C. BROWN, of Worcester, in the county of Worcester and State of Massachusetts, did invent certain Improvements in Apparatus for Sizing and Finishing Skirt-Wire, of which the following is a specification.

The invention relates more particularly to the sizing and finishing of covered or braided hoop-skirt wire, and has for its object to size, (or starch,) calender, (or polish,) and dry covered wire or skirt-springs by means of an organized machine, adapted to perform these several operations in rapid succession upon a continuous strip of material fed or passed through it; and to this end the invention consists in sizing and finishing the exterior or surface of covered wire or metal strips by passing the covered wire or other strip of previously-prepared material through a bath of any suitable sizing compound or starch, and thence over calender-rolls a number of times (after the fashion of a crossed pulley belt or band) and in contact with the surface of an ironer or presser arranged about where the band or strip of wire crosses in such a manner that the wire will have its fibrous covering properly coated with the starch or size and nicely glazed and polished, all as hereinafter more fully described.

To enable those skilled to more fully comprehend the nature of the invention and practice the same we will now proceed to describe the new method of sizing and finishing covered skirt-wire by machinery; referring by letters to the accompanying drawings, in which—

Figure 1:
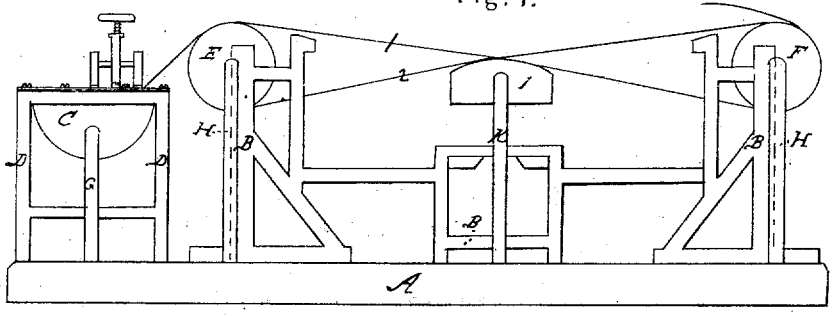
Figure 2:
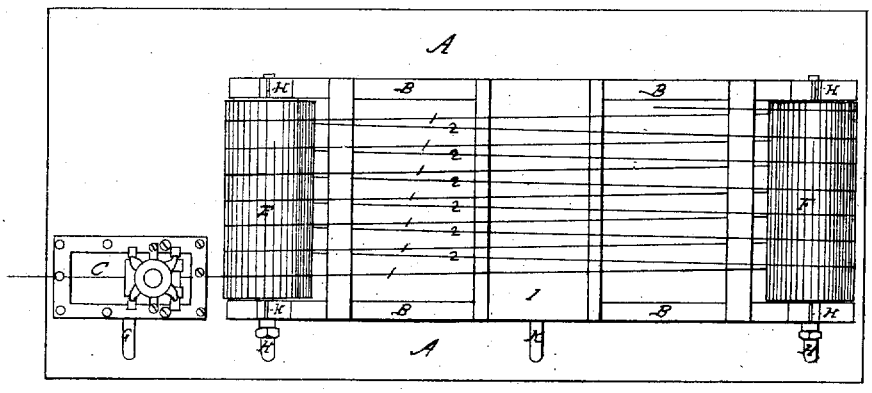
Figure 2:
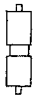
Figure 3:
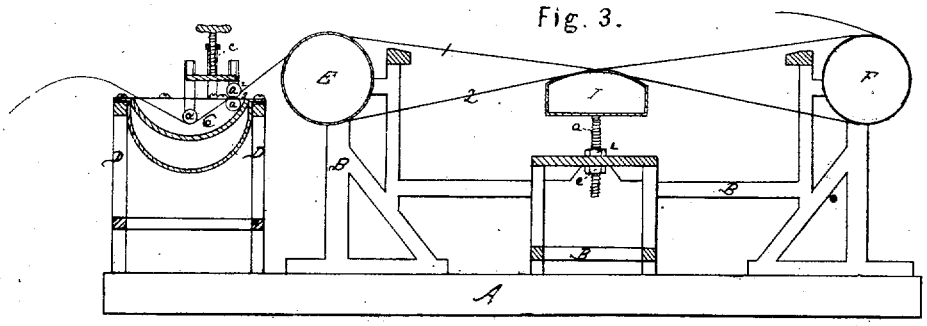

Figure 1 is a side view; Fig. 2, a plan view; and Fig. 3 a longitudinal section of a sizing and finishing machine embodying our invention. Fig. 4 is a detail view of one of the rolls, between two of which the wire passes as it leaves the starch bath.

In the several figures the same parts are designated by the same letter of reference.

A represents a floor or base, upon which is erected or arranged a suitable frame-work, B, at the top of which, near each end, is hung (with its journals H in suitable bearings) a roll or cylinder, E E. About midway between the two rolls E E is placed upon the frame B an adjustable ironer or polisher, I. This polisher I we propose to make of sheet metal in the form of an oblong box, with a smooth convex top surface, and to supply its interior with steam or other heating medium through a pipe, K.

D is a frame or stand, located near one end of frame B, and carrying or sustaining a tank or reservoir, C, which contains the sizing compound. This tank C may be formed with a false bottom, as clearly shown at Fig. 3, and may be supplied with steam through a pipe, G, to keep the contents of said tank warm, (or diluted.) We propose to make both the rolls E and F of metal, hollow, and supply the interior of each through a hollow journal with steam from a conduit-pipe, H K, leading from a source supply.

A′ is a roll or bar, arranged within the tank C, for the purpose of holding down in an immersed condition the wire, as will be presently explained, and $a^2$ $a^3$ are two squeezer rolls or wringers, between which the wire or covered strip passes as it leaves the size tank or bath, and by which the surplus size is drawn off and the coating of size simultaneously pressed into the interstices of the textile covering of the wire, so that when calendered it shall present a smooth surface. These rolls $a^2$ $a^3$ are formed each with an annular groove, as seen clearly at Fig. 4, of such a depth that when the two rolls are placed in position for operation, as shown, with their peripheries in contact, the space between them where the said grooves are cut shall be just sufficient to admit the passage between the said grooves of the wire with a proper coating of sizing well pressed on its covering.

The wire to be sized and finished, which we have represented in red in the drawings, is first immersed in the starch or size bath at C, passing under the roll $a'$, and thence between the wringers or squeezer-rolls $a^2$ $a^3$, from whence it passes over the roll E, thence over and in contact with the convex surface of the ironer or polisher I, thence under and partially around roll E, from whence it returns to the lower portion of roll E, (after the fashion of a crossed pulley-band,) passing in contact again with the polisher I. It then passes over pulley E again, and repeats several times the direction of travel just described, and finally is drawn off from roll E onto a reel for its reception in a finished condition.

The frame B is formed, as shown, with two cross-bars, which are located near the rolls E and F, respectively, and just beneath the strands of wire. In these bars may be put pins or pegs, to project upward between the several strands of wire to keep them separated as the wire travels along.

It will be seen that the wire which passes continuously from the source of supply into the starch or size bath, and thence back and forth over the rolls E and F, has one side presented in contact with the roll E at first; that this same side or surface is then passed over and against the polisher I, and that when said wire reaches the other roll F it has its opposite surface presented to said other roll, which opposite surface is in turn passed over the polisher I as the wire returns to roll E, when the surface first presented to the action of the rolls is again presented to the periphery of roll E, and so on, the wire has its opposite surface brought in contact successively with the rolls and polisher, as just explained.

By the location or arrangement of the convex polishing-surface of I where the strands cross, as illustrated, a single surface is sufficient to iron both sides of the wire.

The polisher I we propose to make adjustable vertically by means of a screw-standard, *a*, and suitable jam-nuts, *e e*, for the purpose of enabling the operator to increase or diminish the pressure of the ironer upon the wire, as circumstances may require.

Although we have described both rolls and the polisher as being heated by steam, it is obvious that the advantages attained by our invention may be arrived at by otherwise applying a sufficient heat to the wire during its passage over the rolls to insure the drying and calendering of the sized or starch-coated surfaces.

Having fully explained the invention, what we claim as new, and desire to secure by Letters Patent, is—

In sizing and finishing covered wire or other covered strips in a continuous operation, causing the wire to pass through a starch bath and thence back and forth over rolls or heated cylinders and in contact with a polisher, in the manner substantially as hereinbefore described.

ICHABOD WASHBURN.
P. L. MOEN.

Witnesses:
G. E. MERRILL,
W. W. RICE.